2 Sheets--Sheet 2.
GEORGE JOHNSTON & WILLIAM F. JOHNSON.
Improvement in Grape Crushers and Stemmers.
No. 125,197.    Patented April 2, 1872.
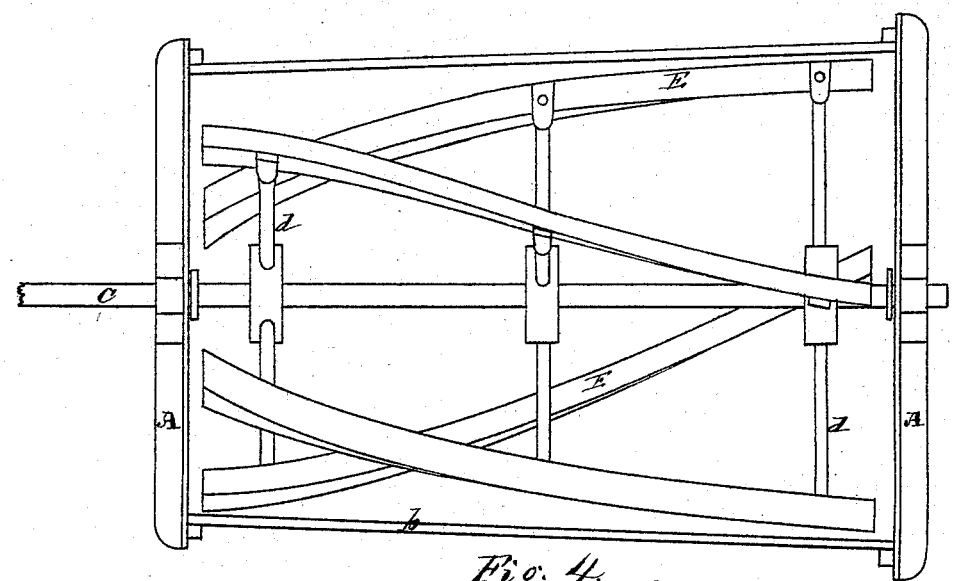
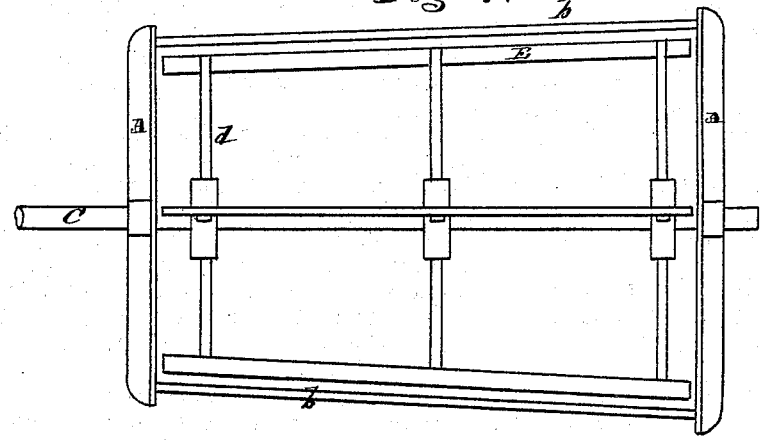

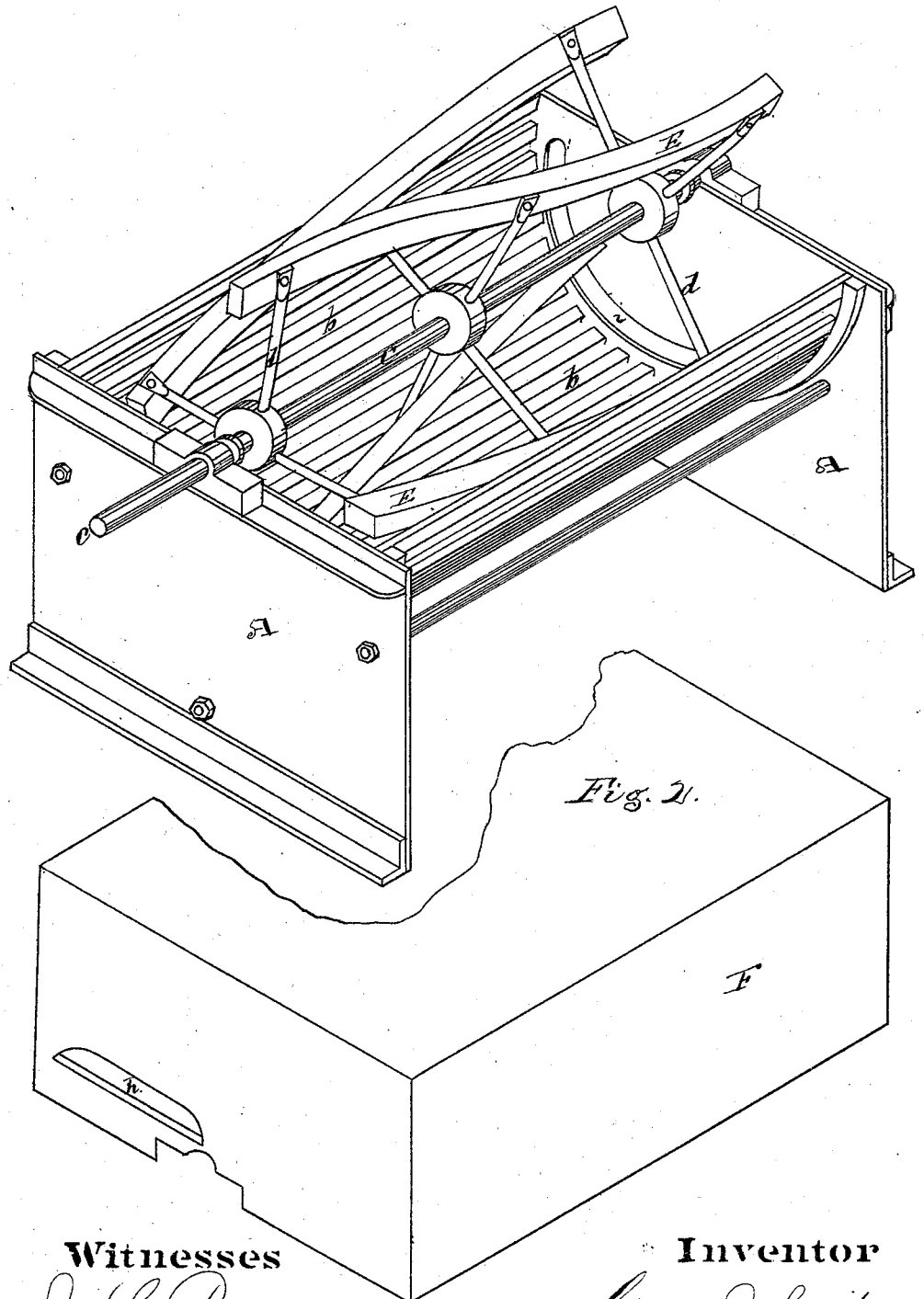

125,197

UNITED STATES PATENT OFFICE.

GEORGE JOHNSTON, OF SACRAMENTO, AND WILLIAM F. JOHNSON, OF FOLSOM, CALIFORNIA.

IMPROVEMENT IN GRAPE CRUSHERS AND STEMMERS.

Specification forming part of Letters Patent No. 125,197, dated April 2, 1872.

SPECIFICATION.

*To all whom it may concern:*

Be it known that we, GEORGE JOHNSTON, of the city and county of Sacramento, and WILLIAM F. JOHNSON, of Folsom, county of Sacramento, State of California, have invented Improvements in Grape Crushers and Stemmers; and we do hereby declare the following description and accompanying drawing are sufficient to enable any person skilled in the art or science to which it most nearly appertains to make and use our said invention or improvements without further invention or experiment.

Our invention relates to improvements in that class of grape crushers and stemmers in which a series of beaters are revolved inside of a box or case, the lower portion of which is formed of parallel slats. In this class of machines, as ordinarily made, the grapes are crushed in separate charges, and the stems thrown out of the case, after the grapes are crushed, by opening one side of the case so as to permit the revolving arms to hurl them out. Our improvement consists in a peculiar construction of the case and revolving beaters, by which the grapes can be continuously fed into the machine at one end, while the stems are automatically discharged from it at the opposite end.

In order to more fully illustrate and explain our invention, reference is had to the accompanying drawing forming a part of this specification, in which—

Figure 1 is a perspective view with cover removed. Fig. 2 shows a portion of the cover. Figs. 3 and 4 are plan views.

A A represent the two ends of the lower half of the machine. These ends are connected together by slats or bars *b*, which are so placed as to form a semicircular trough-like box, as shown. This trough is represented in the present instance as somewhat larger at one end than at the other, so as to cause the lower bars to stand upon an incline. A shaft, C, passes across this box, bearing in boxes on the opposite ends A A. This shaft has two or more sets of radial arms, *d*, each set of which is arranged spirally around the shaft C. At the outer ends of each set of arms is fixed a spiral or screw-shaped beater, E, in such a position that, when the shaft C is revolved, the beaters will be carried around close against the inner faces of the slats *b;* and, in order to accomplish this, when the trough is made larger at one end the arms at the widest end of the trough will have to be made longer than the arms at the narrow or small end. F is a cover or housing for the revolving beaters, and is intended to be placed so as to rest upon the ends A A, and thus forms the upper portion of the machine. The end of this upper portion or cover F which is above the narrow end of the trough has an opening, *h*, through which the grapes to be crushed are introduced into the machine in bunches, just as they are picked from the vine.

The rapid revolution of the shaft C then causes the beaters E to crush the grapes and separate them from the stems; the juice and crushed grapes passing through the slats into a proper receptacle, while the stems will be thrown from one spiral beater to the other, and at each revolution will be carried toward the widest end of the machine until they are carried out through the semicircular slot or opening *i* at the wide end of the box.

Instead of making the lower half of the machine larger at one end than at the other, the bars or slats may be arranged in a true semi-cylindrical form, and the machine be placed at an angle when working. In this case the beaters can be made straight, or nearly so; or the trough can be placed horizontally and the beaters be made spiral.

The main feature of our invention, as will be seen, is in the arrangements for obtaining a continuous-working machine; and this can only be obtained successfully in the above-named class of machines by the method above mentioned.

With one of these machines nine tons of grapes have been crushed, and the stems automatically discharged in a thoroughly separated condition, in one hour, without the necessity of stopping or varying the operation of the machine.

Having thus described our invention, what we claim, and desire to secure by Letters Patent, is—

The combination, in a machine for crushing and stemming fruit, of the spiral revolving beaters E and slats $b$ with the discharge opening $i$, all constructed and arranged to operate substantially as described.

In witness whereof we hereunto set our hands and seals.

GEORGE JOHNSTON. [L. S.]

Witnesses:
 W. T. BINGHAM,
 J. L. BOONE.

WILLIAM F. JOHNSON. [L. S.]

Witnesses:
 J. H. SMITH,
 WM. GERLACH.